United States Patent
Horigami et al.

(10) Patent No.: US 6,544,125 B2
(45) Date of Patent: Apr. 8, 2003

(54) VIDEO GAME DEVICE, METHOD AND MEDIUM WITH PROGRAM FOR CHARACTER CONTROL BASED ON MEASURED MOVING TIME AND POSITION

(75) Inventors: Atsushi Horigami, Tokyo (JP); Shinsuke Mukai, Tokyo (JP); Yosuke Nakano, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/846,396

(22) Filed: May 2, 2001

(65) Prior Publication Data

US 2001/0039207 A1 Nov. 8, 2001

(30) Foreign Application Priority Data

May 2, 2000 (JP) ......................... 2000-133183

(51) Int. Cl.[7] .................. A63F 13/00; A63F 9/24; G06F 17/00; G06F 19/00
(52) U.S. Cl. .................. 463/38; 463/8; 463/36; 463/37; 463/1; 463/7
(58) Field of Search .................. 463/1–8, 36, 37, 463/38; 345/156–162; 273/140

(56) References Cited

U.S. PATENT DOCUMENTS

| | | | | | |
|---|---|---|---|---|---|
| 4,552,360 | A | * | 11/1985 | Bromley et al. | 345/159 |
| 5,793,356 | A | * | 8/1998 | Svancarek et al. | 345/157 |
| 6,067,077 | A | * | 5/2000 | Martin et al. | 345/161 |
| 6,241,611 | B1 | * | 6/2001 | Takeda et al. | 345/156 |
| 6,273,814 | B1 | * | 8/2001 | Komoto | 463/43 |
| 6,354,940 | B1 | * | 3/2002 | Itou et al. | 463/29 |
| 6,354,948 | B1 | * | 3/2002 | Nagayama | 273/140 |

FOREIGN PATENT DOCUMENTS

JP           11342265 A           12/1999

* cited by examiner

*Primary Examiner*—Joe H. Cheng
*Assistant Examiner*—Robert Mendoza
(74) *Attorney, Agent, or Firm*—Sughrue Mion, PLLC (57) ABSTRACT

A method and a video game device are provided which makes a game character perform different actions according to a moving range or a moving speed of an analog button manipulated by a game player. When the analog button is moved to an adjacent point, the game character is controlled to change a posture of holding a sword. When the analog button is moved to a non-adjacent point, the game character is controlled to change a posture of holding the sword or attack enemies by slashing the sword, according to the moving speed of the analog button.

4 Claims, 6 Drawing Sheets

VIDEO GAME DEVICE, METHOD AND MEDIUM WITH PROGRAM FOR CHARACTER CONTROL BASED ON MEASURED MOVING TIME AND POSITION

BACKGROUND OF THE INVENTION

1. Field of the Invention

The invention relates to a method, a video game device, and a program for controlling character who appears in a game, and in particular, to a method, a video game device, and a program for controlling ways of slashing or wielding a sword owned by the character.

2. Description of the Related Art

Nowadays, video game devices have been spread to many families rapidly. And there are various games, such as a role-playing game, a simulation game, a combat game, a puzzle game, and the like. Therefore, many media each of which includes a software program which can execute one of these games are available in store.

Also, there are many types of video game devices to execute the software programs. For example, a home video game device can display images of a game by using a home television monitor. Further, a personal computer or a work station can also display these images on a CRT display connected thereto. In addition to the devices, there are also game devices in an amusement arcade, each of which includes a display device in its body. One game visually represents animated images by successively changing a plurality of different two-dimensional images with time. On the other hand, another game displays a virtual three-dimensional space (in other words, a pseudo three-dimensional space) by representing an object with its depth and changing contents of image according to a point of view of a main character of the games.

Most of games employ the both representing method.

In the above mentioned role-playing game or combat game, a player may move a main character by giving an instruction to defeat an enemy character. Such a movement or action of the main character may be, for example, an action of controlling (or slashing/swinging/wielding) a sword when the main character is attacked by the enemy. Thereafter, the player can proceed to the next stage of the game.

In this event, the player manipulates the sword with looking at game images displayed on a monitor in a point of view of the main character or in another point of view.

In the conventional video game device, simple control of a sword has been performed. That is, the sword which is held by a main character can be wielded just according to player's instructions which are provided via an input device such as analog buttons.

However, moving directions of the analog buttons are limited to about four directions. Therefore, game character's movement which is controlled by the analog button is completely different from actual movement of wielding a sword by a real person and consequently lacks reality. Furthermore, a species of the game character's movement instructed by one of the analog buttons is limited to the instructed direction of slashing a sword and, as a result, it seems that impression of the game is monotonous and is not real.

SUMMARY OF THE INVENTION

It is therefore an object of the invention to provide a video game device and a method which can instruct a game character to act, for example, slash a sword in more various ways, by manipulating analog buttons.

It is another object of the invention to provide a video game device and a method which can individually control different actions, for example, slashing a sword and changing a posture with a sword by manipulating analog buttons or other input device.

It is still another object of the invention to provide a video game device and a method which controls to make the game character perform different actions according to a range or a speed of manipulating of the analog buttons.

Therefore, a video game device and a method of the invention detect manipulations of analog buttons of a game player and compute a range or a speed of the manipulations (movement) of the analog buttons to control make a game character perform different actions according to the computation result.

According to a first aspect of the invention, there is provided a video game device which controls operations of a game character according to manipulations of a button by a game player. The video game device comprises a measuring unit which measures a moving time from when the button leaves a first position to when the button reaches a second position (the button is moved from the first position to the second position by the game player), and a character control unit which controls to make the game character perform operations according to the measured moving time.

According to a second aspect of the invention, there is provided a method of controlling operations of a game character according to a manipulation of a button by a game player. The method comprises the steps of measuring a moving time from when the button leaves a first position to when the button reaches a second position (the button being moved from the first position to the second position by the game player), and controlling to make the game character perform operations according to the measured moving time.

According to a third aspect of the invention, there is provided a recording medium readable by a computer, tangibly embodying a program of instructions executable by the computer to perform a method of controlling operations of a game character according to a manipulation of a button by a game player. The method comprises the steps of measuring a moving time from when the button leaves a first position to when the button reaches a second position (the button being moved from the first position to the second position by the game player), and controlling to make the game character perform operations according to the measured moving time.

According to a fourth aspect of the invention, there is provided a computer data signal embodied in a carrier wave and representing a sequence of instructions which, when executed by a processor, cause the processor to perform a method of controlling operations of a game character according to a manipulation of a button by a game player. The method comprises the steps of measuring a moving time from when the button leaves a first position to when the button reaches a second position (the button being moved from the first position to the second position by the game player), and controlling to make the game character perform operations according to the measured moving time.

According to a fifth aspect of the invention, there is provided a program product comprising computer readable instructions and a recording medium bearing the computer readable instructions. The instructions are adaptable to enable a computer to perform a method of controlling operations of a game character according to a manipulation of a button by a game player. The method comprises the steps of measuring a moving time from when the button leaves a first position to when the button reaches a second position (the button being moved from the first position to the second position by the game player), and controlling to make the game character perform operations according to the measured moving time.

DESCRIPTION OF THE PREFERRED EMBODIMENT

Figure 1:
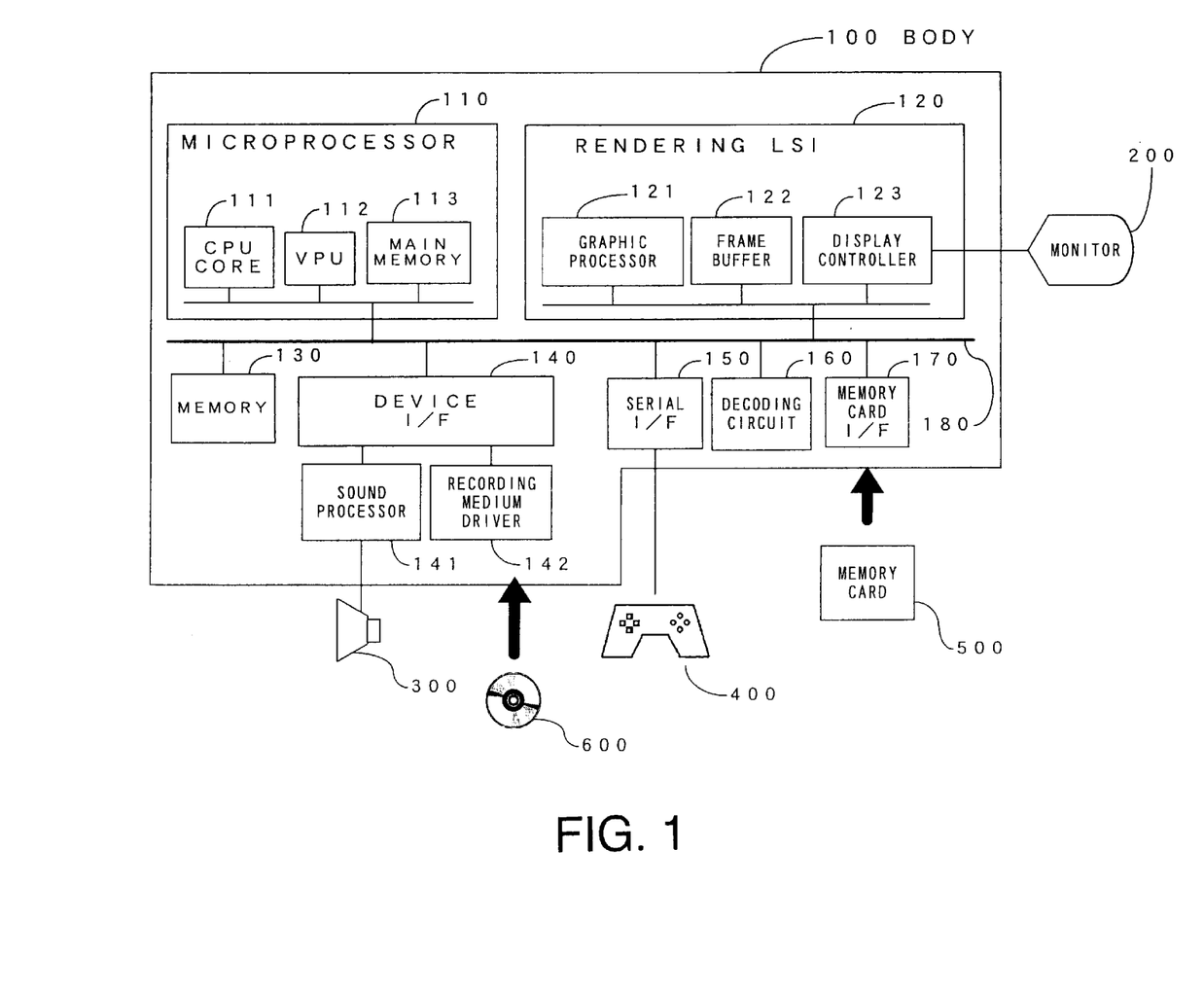
FIG. 1 shows a block diagram of a video game device according to an embodiment of the invention.

Referring to FIG. 1, description is at first made about a video game device of an embodiment of the invention. The video game device shown in FIG. 1 is merely exemplified and may be changed to any other game devices or machines.

The video game device shown in FIG. 1 includes a body 100, a television monitor 200 (hereinafter, simply referred to as a "monitor"), a speaker 300, a controller 400, a memory card 500, and a recording medium 600. The elements 200 through 400 are connected to the body 100. The game device is suited for home use.

The body 100 further includes a microprocessor 110 which controls operations of the other elements, other elements 130–170, and a bus 180 connects these elements.

The microprocessor 110 further includes a CPU core 111, a VPU 112, and a main memory 113, and an internal bus connects the elements to one another. The CPU core 111 is configured, for example, to have two 64-bit ALUs and an FPU. The VPU 112 is a vector operation unit for calculating floating-point data. For example, the VPU 112 may be configured to have a VPU0 and a VPU1.

A rendering LSI 120 includes a graphic processor 121, a frame buffer 122, and a display controller 123, and the elements are connected to an internal bus. Also, to the display controller 123, the monitor 200 is connected. Graphic processor 121 is a microprocessor which is different from the microprocessor 110 and is dedicated to perform graphic processing. The processor 121 executes calculation for coordinate transformation, a light source, rendering operation, and texture mapping to display a pseudo three-dimensional image including polygon images. The frame buffer 122 includes a display area and a non-display area. The display area is an area for storing images corresponding to a display area on the monitor 200.

In this case, it is general that the monitor of a home television is used as the monitor 200. Also, when the method and the video game device of the invention are used in a personal computer or a workstation, a CRT display connected to the personal computer or the workstation may be used as the monitor 200.

A memory 130 is, in particular, used for i/o processing of the recording medium 600 (for example, DVD-ROM or CD-ROM). The memory 130 is generally composed of DRAM (Dynamic RAM).

A device interface 140 controls audio data or input/output data and is connected to a sound processor 141 and a recording medium driver 142.

The sound processor 141 controls to output an effective sound of a game from the speaker 300 at a predetermined timing. That is, music or other effective sound is provided from the speaker 300 by reproducing ADPCM data supplied from the recording medium 600 or voice data stored in a sound buffer.

In this case, a speaker incorporated in a home television is generally used as the speaker 300. Also, when the method and the video game device of the invention are used in a personal computer or a workstation, a speaker connected to the personal computer or the workstation or a built-in speaker may be used as the speaker 300.

The recording medium drive 142 reads data stored in the recording medium 600, and transfers the data to the memory 130 or the main memory 113. In the recording medium 600, a program or image data is stored which is required to perform a game. The contents of the program are read by the recording medium drive 142, and are loaded into the main memory 113 in the microprocessor 110. The recording medium is a portable recording medium such as a DVD-ROM, a CD-ROM, or a floppy disk.

To a serial interface 150, the controller 400 is connected. A player of a game instructs a game character to perform various actions by using the controller 400. Signals form the controller 400 are transferred to the CPU core 111 via the interface 150. In response to the player's instructions, the CPU core 111 control the rendering LSI 120 to display images reflecting the players instructions on the monitor 200 according to instructions of the game program in the main memory 113.

The controller 400 includes a plurality of buttons each of which is assigned to a specific function, for example, to start a game, select an item, and move a game character vertically or horizontally. Also, when the method and the video game device of the invention are used in a personal computer or a workstation, a keyboard or joy stick connected to the personal computer or the workstation may be used as the controller 400. Since the method and the video game device of the invention are closely related to a structure of the controller 400, detail description about the structure will be made later with reference to FIGS. 2 and 3.

A decoding circuit 160 decodes image data, including still or animated image data, which are read out from the recording medium 600 and are stored in the main memory 113 and stores the decoded data in the main memory 113 again.

Specifically, the decoding circuit 160 is capable of carrying out high-speed execution of inverse discrete cosine transform (inverse DCT) operations, and it is also capable of expanding compressed data read out from the recording medium 150 in accordance with still color image compression standards (known as JPEG) or cumulative media moving image encoding standards (known as MPEG).

When the memory card 500 is inserted into a memory card interface 170, the memory card interface 170 reads the contents of the memory card 500, and loads the contents into the main memory 113 based on a judgement of the CPU core 111.

The bus 180 serves as a general purpose data transmission path between the elements connected to the bus 180.

The memory card 500 stores various parameters of, for example, keeping states of the game when the game is suspended. Herein, a card type memory such as the memory card 150 is used, but a type of memory is not limited to the card type memory. The memory card interface 170 prepares two memory card slots so as to insert two memory cards simultaneously and read data from them. For example, two memory cards are used in a game providing a fight between two players and each of the two memory cards stores data about one of the players.

In addition, the video game device may includes a USB interface or an IEEE 1394 interface (not shown), and data can be transmitted between the device and an outside device via these interfaces.

Also, in the case where the method according to the invention is applied to the arcade game device, the body 100, the monitor 200, the speaker 300, and the controller 400 shown in FIG. 1 may be all incorporated into a single body.

Figure 2:
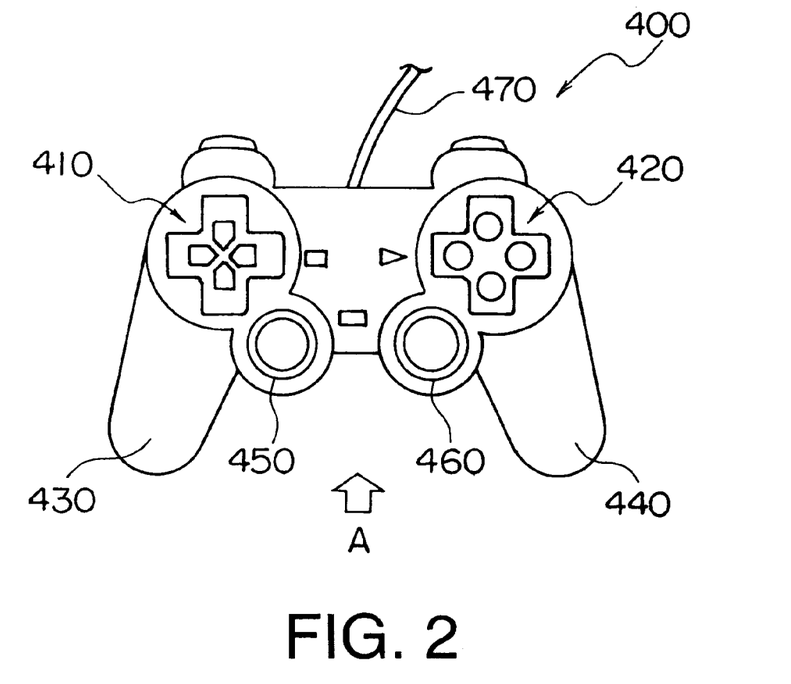
FIG. 2 shows a front elevation of a controller of a video game device according to an embodiment of the invention.
Figure 3:
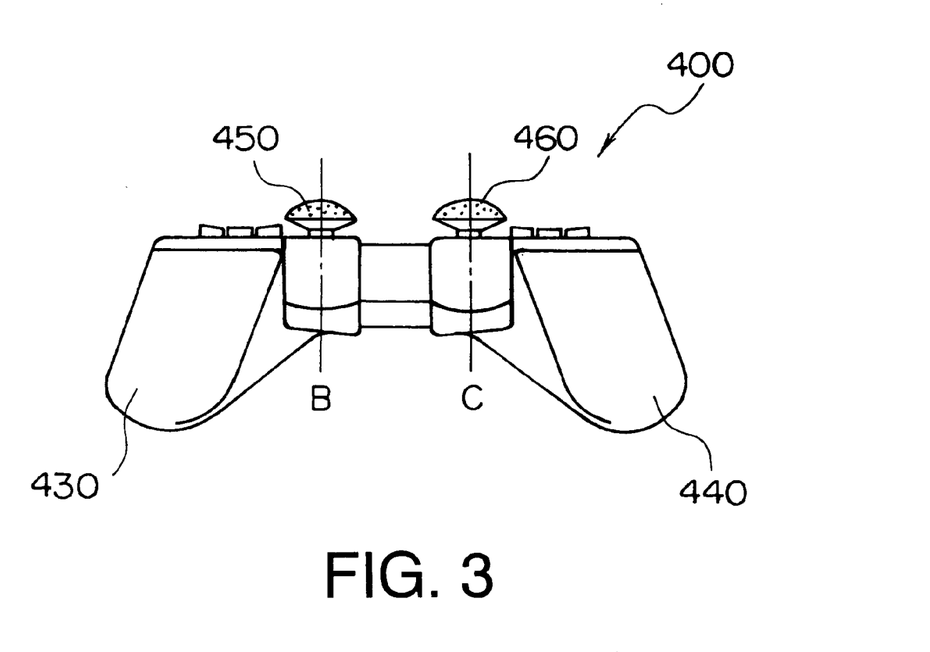
FIG. 3 shows a side elevation of a controller of a video game device according to an embodiment of the invention.

Next, description is made about the structure of the controller shown in FIG. 1 with reference to FIGS. 2 and 3.

The controller 400 includes a first operation unit 410, a second operation unit 420, a first handle 430, a second handle 440, a third operation unit 450, a fourth operation unit 460, and a connection code 470. The controller 400 further includes a start switch (not shown) to start a game and a select switch (not shown) to select difficulty level between the first operation unit 410 and the second operation unit 420, and includes, and a mode select switch (not shown) to select operation modes of the third operation unit 450 and the fourth operation unit 460 between the third operation unit 450 and the fourth operation unit 460. Also, the controller 400 includes a display unit which displays the operation modes of the operation units. The controller 400 includes some other buttons, but descriptions about the buttons are omitted since the buttons are not concerned with the invention.

When a player plays a game, the player wraps the first handle 430 with the palm of the player's left hand, and wraps the second handle 440 with the palm of the right hand. And then, operation units 410, 420, 450, 460, and the other buttons are manipulated by fingers of the left and the right hands of the player.

Also, the controller 400 is connected to the serial interface 150 of the body 100 through the connection code 470. Operations of the player using the buttons are transmitted to the serial interface 150 through the connection code 470, and interpreted by the microprocessor 110. On the contrary, instructions are sent from the microprocessor 110 to the controller 400 via the serial interface 150 and the connection code 470.

The first operation unit 410 has four buttons and the buttons are used to, for example, control movement of a game character displayed on the monitor 200. When a button located on the top side is pushed, the game character moves upward and when a button located on the bottom side is pushed, the game character moves downward. Similarly, when a left button is pushed, the game character moves leftward, and a right button is pushed, the game character moves rightward.

The second operation unit 420 has four buttons in the same way as the first operation unit 410. Each of the buttons is assigned to a specific function of the game character. When one of the button is pushed, the game character performs a function the pushed button is assigned to.

In the invention, the third operation unit 450 and the fourth operation unit 460 are used to instruct movement of the game character in an analog-like control. FIG. 3 shows a side elevation of the controller 400 when one looks at the controller 400 in the direction A shown in FIG. 2.

The third operation unit 450 and the fourth operation unit 460 are attached to the controller 400, to revolve around the central pivots B and C, respectively. Also, each of the third operation unit 450 and the fourth operation unit 460 is composed of an analog button, and the button can be slanted in any directions with a fulcrum where the button is engaged to the controller body. Each of the analog buttons is controlled to be recovered to original neutral position after the player slants the button by adding force.

Whether or not each analog button is slanted, a slanted direction, and a slanted angle (that is, a slanted angle against the pivot B or C shown in FIG. 3, it is zero degree when the button resides in the original neutral position) of each analog button, or coordinates of each analog button computed from the slanted direction and the slanted angle can be determined by the microprocessor 110 in a predetermined interval. The slanted direction can be represented as one of 256 directions, or with accuracy of one degree (that is, one of 360 directions). The slanted angle can have the same accuracy as the slanted direction.

Figure 4:
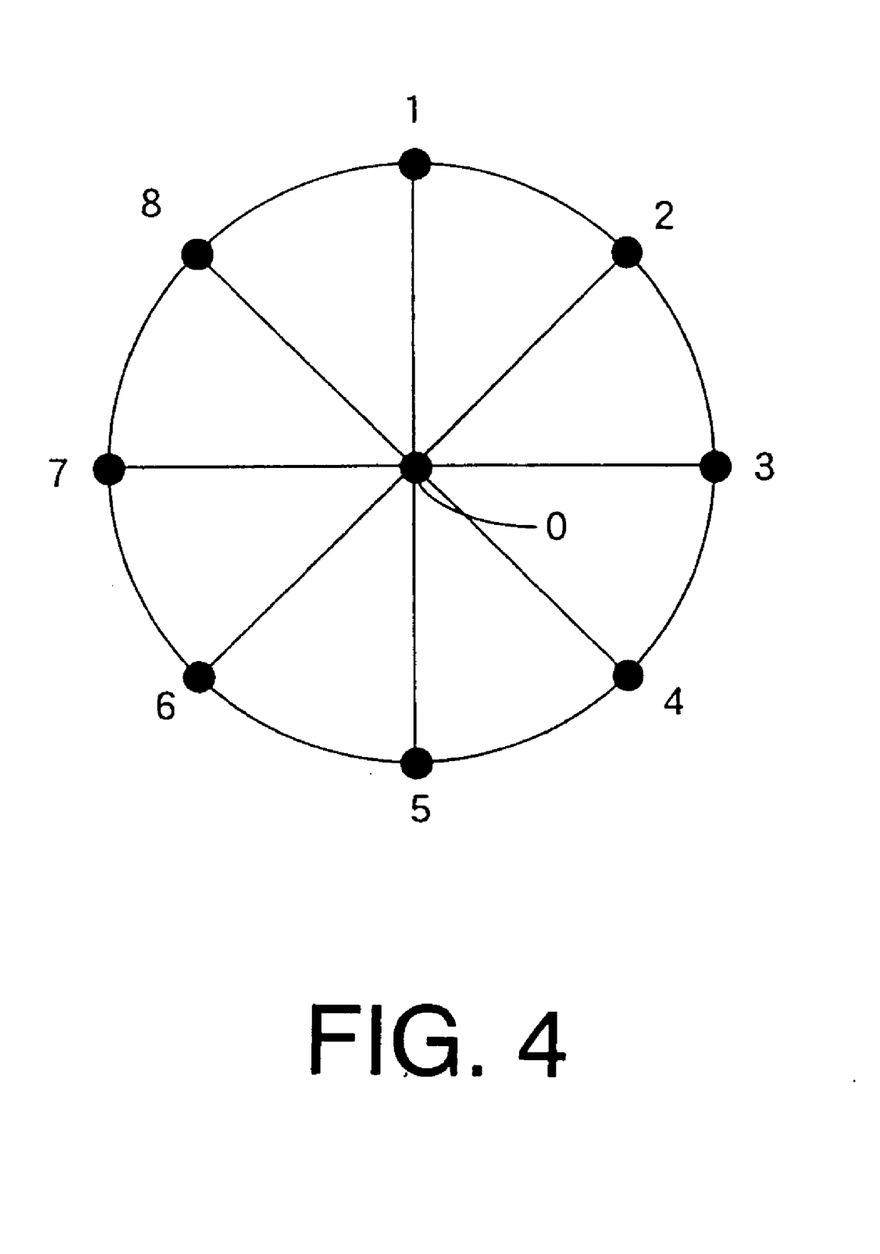
FIG. 4 shows coordinates of possible locations which an analog button is moved to in a video game device according to an embodiment of the invention.

Herein, referring to FIG. 4, consideration is made about coordinates of a position of one of the analog buttons. Each of the central point and points on the circumference of a circle shown in FIG. 4 respectively corresponds to positions of the analog button which is slanted by a game player or is in an initial state. The central point, which is denoted by "0", corresponds to a position of the analog button which is not charged any force by the game player.

The point denoted by "1" corresponds to positions of the analog button which is slanted upward. When the analog button is slanted upward by a predetermined distance and is moved to a predetermined area surrounding the point "1", it is determined that the button is slanted and moved to the point "1".

Similarly, the point denoted by "3" corresponds to one of the positions of the analog button that is slanted rightward and is moved to a predetermined area surrounding the point "3". The point denoted by "5" corresponds to positions of the analog button that is slanted downward and is moved to a predetermined area surrounding the point "5". The point denoted by "7" corresponds to positions of the analog button which is slanted leftward and is moved to a predetermined area surrounding the point "7".

Therefore, each of the points "1" to "8" does not correspond to one position of the analog button which is strictly defined by one slanted direction and one slated angle. Each of the points corresponds to positions, of the analog button, which are defined by a range of slanted directions and a range of slanted angles.

In this instance, to simplify explanation, the method of the invention is configured to detect whether a position of the analog button belongs to one of the above described points, but more points can corresponds to possible positions of the analog button by compressing each of the predetermined areas surrounding the points.

Also, in this example, points denoted by "2" and "8" which are next to the point denoted by "1" are referred to as adjacent points. The other points are referred to as non-adjacent points.

Figure 5:
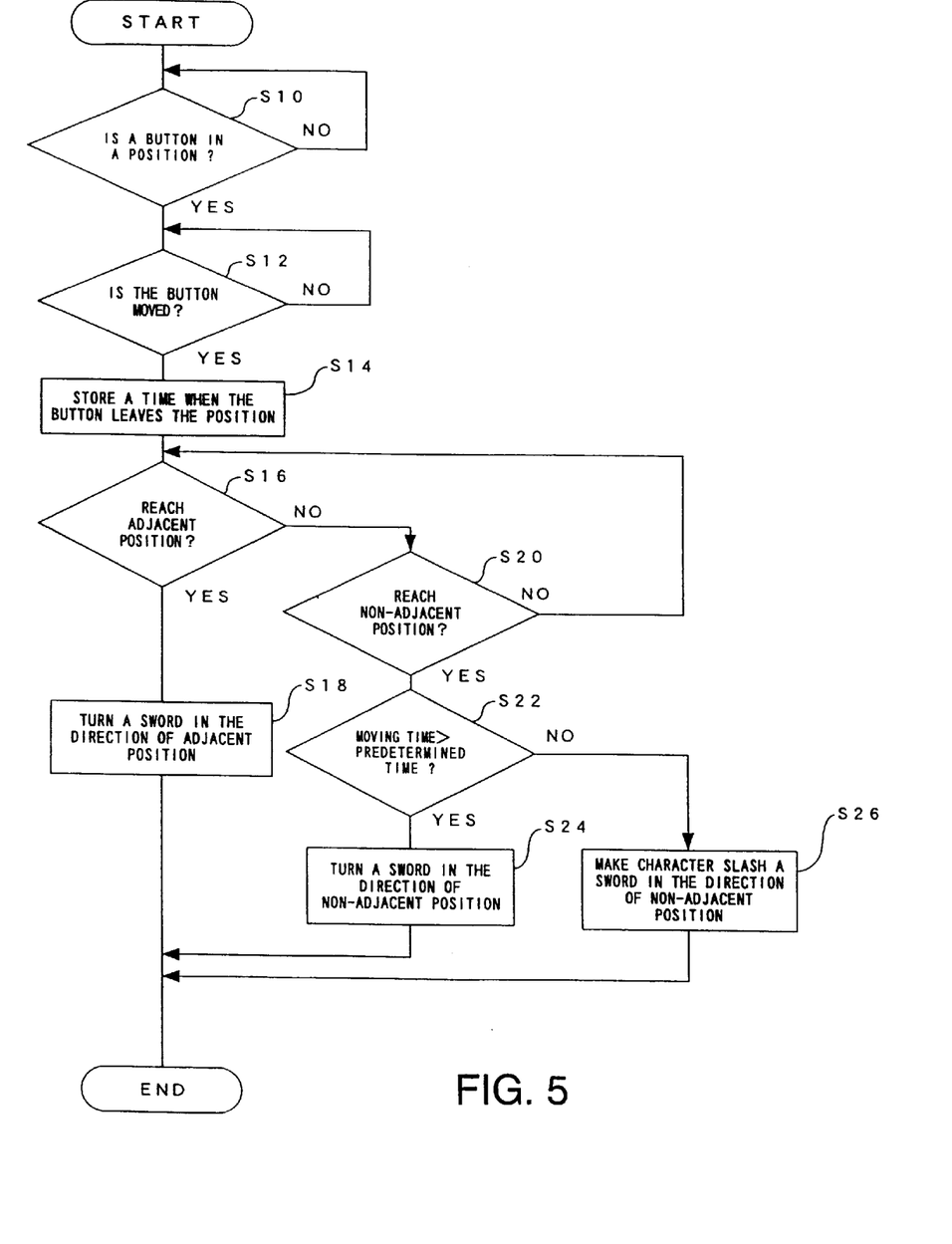
FIG. 5 shows a flowchart representing a method of controlling the way how a game character slashes a sword.

Next, description is made about a method of controlling a game character according to the invention with reference to FIG. 5.

The method shown by a flowchart is performed by the microprocessor 110. The microprocessor 110 can repeat the method in a very short interval and substantially detect operations of analog button by a game player in real time. That is, the game character displayed on the monitor 200 immediately responses to operation of the analog button by the game player and commences action corresponding to the operation of the button. Herein, to control the game character, any of the third operation unit 450 and the fourth operation unit 460 may be used as an analog button.

At first, in step S10, it is determined that which point a current position of the analog button belongs to. In this flow of the method, since it is finally required to determine whether the analog button is moved from a predetermined point to one of adjacent points or to one of non-adjacent points, when the analog button is in a predetermined point, the flow should be commenced.

The predetermined point is one of the points denoted by "0"–"8". As described above, each of the points does not represent one position of the analog button, but collectively represent a range of positions, that is, the positions defined a range of slanted directions and a range of slanted angles of the analog button.

Also, in this example, it is assumed that when the analog button is in the point determined in step S10, the game character displayed on the monitor 200 holds a sword in the direction of the determined point. For example, when the determined point is the point "0", the character holds the sword with its tip pointed at an enemy's eyes. Alternatively, when the determined point is the point "1", the character holds the sword over his head with both hands. When the position of the analog button resides in an intermediate position which does not belong to any points (step S10 (NO)), the same step is repeated in a predetermined interval.

When the analog button is moved and is determined to belong to the point "0" through point "8" (step S10 (YES)), process proceeds to step S12. In step S12, it is determined that whether or not the analog button is moved by the player. Herein, if the analog button is simply moved from the current position, it can be determined that the analog button is moved. Alternatively, if the analog button is moved and leaves the predetermined area surrounding the point which the analog button currently belongs to, it also can be determined that the analog button is moved.

If the analog button is not moved (step S12(NO)), step S12 is repeated in a predetermined interval.

When the player moves the analog button, determination in step S12 is YES and process proceeds to step S14. In step S14, a time when the analog button leaves the point which the analog button belongs to is stored. Also, as described above, a time when the analog button leaves the predetermined area surrounding the point which the analog button currently belongs to can be stored.

Next, in step S16, it is determined whether the analog button is moved to one of the adjacent points. The adjacent points are, as described above, the points which are next to the point which is determined in step S10. For example, if the determined point is point "1", the adjacent points are points "0", "2", and "8".

If it is determined that the analog button is not moved to any of the adjacent points (step S16(NO)), process proceeds to step S20. In step S20, it is determined whether or not the analog button is moved to one of the non-adjacent points. The non-adjacent points are, for example, the points other than points "0", "2", and "8", if the point determined in step S10 is point "1". If the analog button reaches neither adjacent point nor non-adjacent point (step S20(NO)), process returns to step S16 again.

If it is determined that the analog button reaches an adjacent point (step S16 (YES)), the microprocessor 110 instructs the rendering LSI 120 to display the game character changing aspect of holding the sword in step S18. For example, when the analog button is moved from point "1" to point "0", the game character changes its posture form a first posture that the character holds the sword over his head with both hands, to a second posture that the character holds the sword with its tip pointed at an enemy's eyes.

On the other hand, if it is determined that the analog button is moved to a non-adjacent point (step S20 (YES)), a moving time is calculated in step S22, from the time stored in step S14 to a time when the analog button reaches the non-adjacent point.

And in step S22, it is determined whether or not the moving time is in a predetermined range.

If the moving time exceeds the predetermined range (step S22(YES)), process proceeds to step S24. And in step S24, the game character is controlled to change the direction of a tip of the sword to the direction corresponding to the non-adjacent point. For example, when the analog button is slowly moved from point "1" to point "5", the game character changes a style from a posture of holding the sword upward to a posture of holding the sword downward.

On the other hand, the moving time enters within the predetermined range (step S22(NO)), process proceeds to step S26, and then, the game character is displayed, who is slashing the sword in the direction corresponding to the non-adjacent point. Of course, in this time, if there are enemies on locus of the slashed sword, it is displayed that the enemies are cut or defeated. Also, according to a moving speed of the analog button, a speed of slashing sword can be increased.

As described above, if the game player want to change a sword holding posture of the game character, he/she slowly moves the analog button toward an adjacent point or a non-adjacent point. If the game player instruct the game character to slash the sword, he/she quickly moves the analog button toward a non-adjacent point. If more quick slashing of the sword is required, the game player moves the analog button more quickly.

In the above described flowchart of FIG. 5, to simplify explanation, consideration is omitted about special operations. The special operations, for example, includes an operation that the analog button is once moved to another position and then moved to the original position, and an operation that the analog button is moved another position and then held in an intermediate position which does not belongs to any other points.

But, actual game program should deal with such the special operations on the basis of the predetermined rule.

Next, description is made about how the game character is actually displayed on the monitor 200 according to operation of the analog button with reference to FIGS. 6A, 6B, and 7A–7C.

Figure 6A:
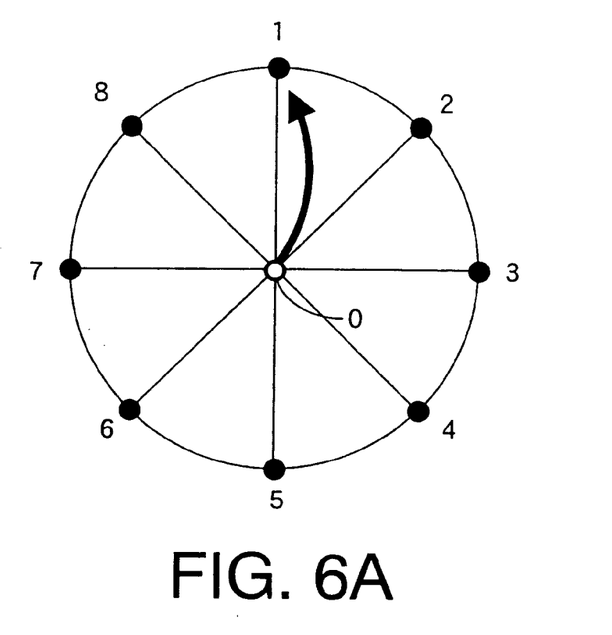
FIGS. 6A and 6B show patterns of movement of an analog button.
Figure 6B:
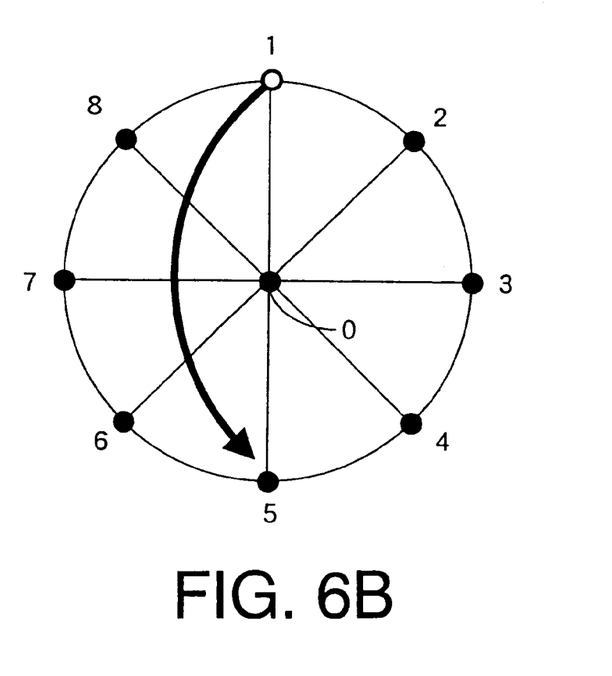

Herein, as described above, the third operation unit 450 and the fourth operation unit 460 may be used as the analog button. In FIGS. 6A and 6B, coordinates of the analog button are shown similar to the coordinates shown in FIG. 4. In each diagram, current position of the analog button is represented by a small circle with its inside colored white, and locus of moving of the analog button by the game player is represented by an arrow.

Figure 7A:
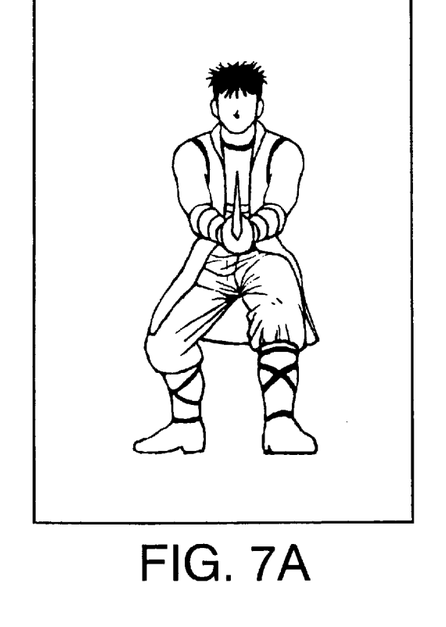
FIGS. 7A–7C show characters displayed in the different way according to the movement of the analog button in FIGS. 6A and 6B.
Figure 7B:
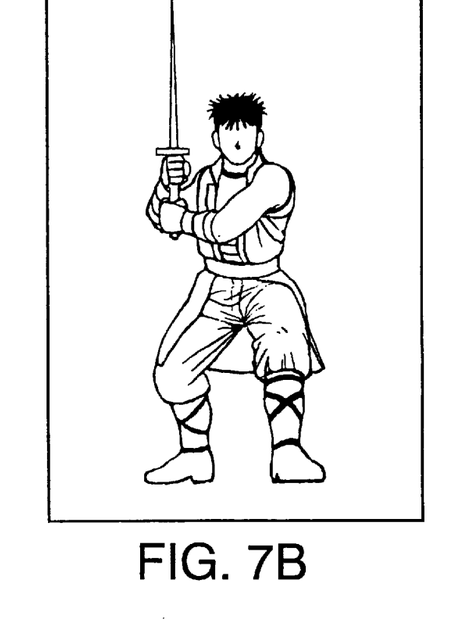
Figure 7C:
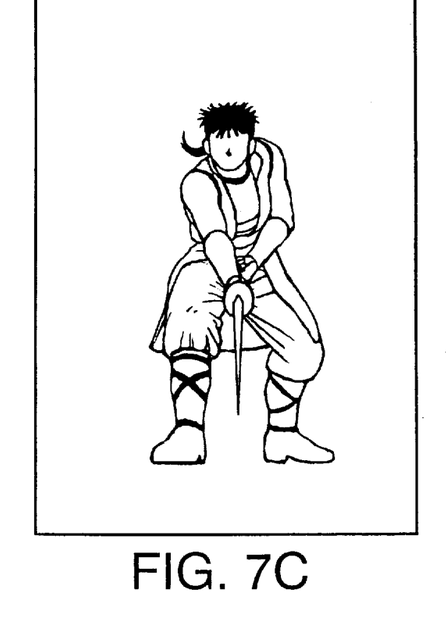

In FIGS. 7A–7C, the game characters displayed on the monitor 200 are shown. Each of the game characters changes a posture of holding sword, or slashes the sword to defeat enemies in response to operation of the analog button. Actions of the game character transits from FIGS. 7A through 7C as time goes by. Herein, relationship between the actions and operations of the analog button by the game player is explained in detail as follows.

At first, in FIG. 7A, the game character who facing enemies is shown. The character now holds the sword with its tip pointed at an enemy's eyes.

At this time, the game player does not move the analog button and a position of the button resides in point "0" as shown in FIG. 6A.

Next, in FIG. 6A, when the game player moves the analog button from point "0" to point "1" (this is represented by the arrow in FIG. 6A), the game character is displayed as shown in FIG. 7B. That is, it is displayed that the character holds the sword over his head. At this time, coordinates of the analog button are shown in FIG. 6B. In FIG. 6B, reflecting the operation of the game player, the small circle with its inside colored white is located at point "1".

In this case, the game character shown in FIG. 7B merely changes a posture from a posture shown in FIG. 7A and does not intend to attack the enemies.

Next, in the situation of FIG. 6B, when the game player moves the analog button from point "1" to point "5" (this is represented by an arrow shown in FIG. 6B), and when a moving time from a time instant at which the analog button leaves point "1" to another time instant at which the analog button reaches point "5" falls within a predetermined time, the game character slashes the sword downward to pose a posture as shown in FIG. 7C. If there are enemies on a locus of the sword, the enemies are cut and defeated.

When the game player slowly moves the analog button from point "1" to point "5", and when a moving time from when the analog button leaves point "1" to when the analog button reaches point "5" exceeds a predetermined time, the game character slowly changes a posture to a posture as shown in FIG. 7C. In this case, the game character does not intend to hurt the enemies, but merely changes a sword holding posture.

As described above, according to the method of controlling character of the invention, if the game player moves the analog button to adjacent point, the game character is controlled to change the sword holding posture, on the other hand, if the game player moves the analog button to non-adjacent point, the game character is selectively controlled to change the sword holding posture or slash the sword on the basis of a moving speed of the analog button.

This means it is possible to make the game character perform more and various actions by using a finger of a left hand or a right hand of the game player.

In the above description, although positions of the analog button is assigned to one of nine points "0" to "8", more points may be used.

Also, main feature of the invention is to make the game character perform different various actions according to difference of a moving range or a moving time of the analog button. Therefore, it is not required that actions to be changed according to the difference are limited to changing a sword holding posture and slashing of a sword as the above mentioned example.

Thus, the method of the invention can be, for example, applied to a game character of a fishing game, and the player can control a fishing rod operation of the game character.

What is claimed is:

1. A video game device which controls operations of a game character according to manipulations of a button by a game player, comprising:

a measuring unit which measures a moving time from a time instant at which the button leaves a first position to another time instant at which the button reaches a second position, the button being moved from the first position to the second position by the game player;

a character control unit which controls to make the game character perform operations according to the measured moving time; and a position determining unit which determines a position relationship between the first and the second positions and which also determines whether or not the second position belongs within a predetermined area adjacent to the first position;

the character control unit being operative to make the game character perform operations according to a combination of the measured moving time and the determined position relationship and comprising:

(1) a first control unit which makes the game character change a posture of holding a sword when the position determining unit determines that the second position is adjacent to the first position;

(2) a second control unit which makes the game character change a posture of holding the sword when the position determining unit determines that the second position is not adjacent to the first position and when the moving time of the button exceeds a predetermined time; and (3) a third control unit which makes the game character slash the sword when the position determining unit determines that the second position is not adjacent to the first position and when the moving time of the button is within the predetermined time.

2. The video game device of claim 1, wherein the direction of the slashing of the sword and the direction of the changing the posture of holding the sword are determined according to the moving direction of the button from the first position to the second position.

3. A method for use in a video game device to control operations of a game character according to manipulations of a button by a game player, comprising the steps of:

measuring a moving time from a time instant at which the button leaves a first position to another time instant at which the button reaches a second position, the button being moved from the first position to the second position by the game player;

controlling to make the game character perform operations according to the measured moving time; and determining a position relationship between the first and the second positions and which also determines whether or not the second position belongs within a predetermined area adjacent to the first position;

the character control step being operative to make the game character perform operations according to a combination of the measured moving time and the determined position relationship and comprising the steps of:

making the game character change a posture of holding a sword when the position determining unit determines that the second position is adjacent to the first position;

making the game character change a posture of holding the sword when the position determining unit determines that the second position is not adjacent to the first position and when the moving time of the button exceeds a predetermined time; and making the game character slash the sword when the position determining unit determines that the second position is not adjacent to the first position and when the moving time of the button falls within the predetermined time.

4. A recording medium which is readable by a computer and which stores a program composed of instructions executable by the computer to perform a method of controlling operations of a game character according to manipulations of a button by a game player, the method comprising the steps of:

measuring a moving time from a time instant at which the button leaves a first position to another time instant at which the button reaches a second position, the button being moved from the first position to the second position by the game player;

controlling to make the game character perform operations according to the measured moving time; and determining a position relationship between the first and the second positions and which also determines whether or not the second position belongs within a predetermined area adjacent to the first position;

the character control step being operative to make the game character perform operations according to a combination of the measured moving time and the determined position relationship and comprising the steps of:

making the game character change a posture of holding a sword when the position determining unit determines that the second position is adjacent to the first position;

making the game character change a posture of holding the sword when the position determining unit determines that the second position is not adjacent to the first position and when the moving time of the button exceeds a predetermined time; and making the game character slash the sword when the position determining unit determines that the second position is not adjacent to the first position and when the moving time of the button falls within the predetermined time.

* * * * *